(12) United States Patent
Suzuki

(10) Patent No.: US 10,742,156 B2
(45) Date of Patent: Aug. 11, 2020

(54) CONTROL APPARATUS OF ROTATING ELECTRICAL MACHINE

(71) Applicant: DENSO CORPORATION, Kariya, Aichi-pref. (JP)

(72) Inventor: Takuto Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/332,578

(22) PCT Filed: Sep. 6, 2017

(86) PCT No.: PCT/JP2017/032126
§ 371 (c)(1),
(2) Date: Mar. 12, 2019

(87) PCT Pub. No.: WO2018/047866
PCT Pub. Date: Mar. 15, 2018

(65) Prior Publication Data
US 2019/0334471 A1    Oct. 31, 2019

(30) Foreign Application Priority Data

Sep. 12, 2016 (JP) ................. 2016-177956
Aug. 23, 2017 (JP) ................. 2017-160310

(51) Int. Cl.
*H02P 29/032* (2016.01)
*H02P 1/02* (2006.01)
(Continued)

(52) U.S. Cl.
CPC ............ *H02P 29/032* (2016.02); *B60R 16/03* (2013.01); *B60W 10/08* (2013.01); *F02D 29/06* (2013.01);
(Continued)

(58) Field of Classification Search
CPC ..................................... H02P 29/032
(Continued)

(56) References Cited

U.S. PATENT DOCUMENTS 5,264,779 A * 11/1993 Satoh ............... H02J 7/1461
322/28
6,462,517 B2 * 10/2002 Asada ............... H02J 7/166
322/28
(Continued)

FOREIGN PATENT DOCUMENTS

JP      H06-24939 B2    4/1994
JP      2000-197394 A   7/2000
JP         4442582 B2   3/2010

OTHER PUBLICATIONS

Dec. 5, 2017 International Search Report issued in International Patent Application No. PCT/JP2017/032126.

*Primary Examiner* — Pedro J Cuevas
(74) *Attorney, Agent, or Firm* — Oliff PLC

(57) ABSTRACT

A control apparatus controls rotating electrical machine which is applied to a vehicle in which an engine is automatically stopped in the case where predetermined automatic stop conditions are satisfied, and, the engine is automatically restarted in the case where predetermined restarting conditions are satisfied, the rotating electrical machine receiving supply of an exciting current from a transistor-chopper type exciting circuit in which a first pair of facing arms of a bridge circuit is configured with power transistors, and a second pair of arms is configured with diodes, and the rotating electrical machine having a power generation function based on rotational force of the engine. The control apparatus executes first grounding control in which, during automatic stop of the engine, among the first
(Continued)

pair of arms, the power transistor connected on an earth side of the rotating electrical machine is put into an ON state.

12 Claims, 5 Drawing Sheets

(51) Int. Cl.
  *F02D 29/06* (2006.01)
  *F02N 11/08* (2006.01)
  *B60R 16/03* (2006.01)
  *B60W 10/08* (2006.01)
(52) U.S. Cl.
  CPC .......... *F02N 11/0803* (2013.01); *H02P 1/029* (2013.01)
(58) Field of Classification Search
  USPC .................................. 290/8; 322/21, 28, 94
  See application file for complete search history.

(56) References Cited

U.S. PATENT DOCUMENTS

| | | | | |
|---|---|---|---|---|
| 6,504,346 B2* | 1/2003 | Nakamura | ............ | H02J 7/1492 322/90 |
| 6,803,747 B2* | 10/2004 | Taniguchi | ............... | F02D 29/06 322/28 |
| 6,900,618 B2* | 5/2005 | Maehara | ................. | H02J 7/163 322/28 |
| 7,327,545 B2* | 2/2008 | Konishi | ................ | H02J 7/1461 318/400.21 |
| 7,394,227 B2* | 7/2008 | Uematsu | ................... | H02P 9/48 322/27 |
| 7,436,154 B2* | 10/2008 | Asada | ....................... | H02P 9/10 322/24 |
| 7,564,224 B2* | 7/2009 | Aoyama | ................... | H02P 9/48 322/27 |
| 7,570,027 B2* | 8/2009 | Teramoto | ................. | H02P 9/02 322/24 |
| 7,592,785 B2* | 9/2009 | Kimura | ................. | B60L 15/025 322/28 |
| 8,487,592 B2* | 7/2013 | Koeppl | ..................... | H02P 9/02 322/59 |
| 8,541,988 B2* | 9/2013 | Horihata | ................ | H02J 7/1461 322/21 |
| 8,547,071 B2* | 10/2013 | Horihata | ............. | H02P 29/0241 322/21 |
| 8,749,206 B2* | 6/2014 | Koeppl | ..................... | H02P 9/02 322/59 |
| 9,294,027 B2* | 3/2016 | Horihata | ............. | H02P 29/0241 |
| 10,056,752 B2* | 8/2018 | Horihata | ............. | H02P 29/0243 |
| 2004/0155632 A1* | 8/2004 | Wilson | .................... | H02P 9/305 322/28 |
| 2006/0186862 A1* | 8/2006 | Takahashi | ............... | H02P 9/102 322/28 |
| 2006/0221525 A1* | 10/2006 | Konishi | ................ | H02J 7/1461 361/93.1 |
| 2007/0085511 A1* | 4/2007 | Uematsu | .................... | H02P 9/48 322/28 |
| 2007/0210763 A1* | 9/2007 | Aoyama | ................... | H02P 9/48 322/28 |
| 2007/0241724 A1 | 10/2007 | Asada | | |
| 2009/0058373 A1* | 3/2009 | Graovac | ................... | H02P 9/48 322/25 |
| 2012/0068671 A1* | 3/2012 | Horihata | ............... | H02J 7/1492 322/94 |
| 2014/0055894 A1* | 2/2014 | Maruyama | ............... | H02H 9/04 361/56 |
| 2014/0334044 A1* | 11/2014 | Horihata | .................. | H02H 7/06 361/20 |
| 2014/0375153 A1* | 12/2014 | Suzuki | ................. | H02K 11/048 310/54 |
| 2014/0375180 A1* | 12/2014 | Suzuki | ................. | H02K 11/048 310/68 D |
| 2014/0375282 A1* | 12/2014 | Horihata | ................. | H02P 9/009 322/94 |
| 2015/0015215 A1* | 1/2015 | Wu | ......................... | H02H 3/24 322/28 |
| 2015/0102782 A1* | 4/2015 | Nakayama | ................ | H02P 9/48 322/21 |

\* cited by examiner

CONTROL APPARATUS OF ROTATING ELECTRICAL MACHINE

CROSS-REFERENCE TO RELATED APPLICATION

This application is the U.S. national phase of International Application No. PCT/JP2017/032126 filed Sep. 6, 2017 which designated the U.S. and claims priority to Japanese Patent Applications No. 2016-177956 filed Sep. 12, 2016, and No. 2017-160310 filed Aug. 23, 2017, the contents of which are incorporated herein by reference.

TECHNICAL FIELD

The present disclosure relates to a control apparatus that controls rotating electrical machine having a power generation function.

BACKGROUND ART

Conventionally, as this kind of control apparatus, there is an apparatus which includes a transistor chopper-type exciting circuit that supplies an exciting current for a vehicle from a generator, and in which a current for exciting a rotor is regenerated in a battery (see PTL 1). In the apparatus disclosed in PTL 1, on condition that a key switch of an engine is in an off state, and rotation speed of the engine is equal to or lower than 200 rpm, a power transistor connected on an earth side is put into an ON state, and a power transistor connected on an output terminal side is put into an OFF state at the above-described exciting circuit. Accordingly, an exciting winding of the rotor is prevented from having a floating potential when an engine is not operated after traveling to prevent or suppress corrosion of the rotor due to a leakage current.

CITATION LIST

Patent Literature

[PTL 1] JP 4442582 B

SUMMARY OF THE INVENTION

Incidentally, there is a vehicle in which an engine is automatically stopped in the case where predetermined automatic stop conditions are satisfied, and thereafter, the engine is automatically restarted in the case where predetermined restarting conditions are satisfied. In such a vehicle, there is a possibility that a rotor may corrode as a result of a generator being stopped during automatic stop of the engine, and a leakage current flowing through the rotor which is in a stop state. In the apparatus disclosed in PTL 1, corrosion of the rotor during automatic stop of the engine is not taken into account, and there is still left room for improvement.

Note that such circumstances also generally apply to rotating electrical machine having a power generation function as well as a generator.

The present disclosure has been made to solve the above-described problem, and is mainly directed to providing a control apparatus of rotating electrical machine which can prevent or suppress corrosion of a rotor during automatic stop of an engine.

First means for solving the above-described problem is a control apparatus which controls rotating electrical machine which is applied to a vehicle in which an engine is automatically stopped in the case where a predetermined automatic stop condition is satisfied, and, thereafter, the engine is automatically restarted in the case where a predetermined restarting condition is satisfied, the rotating electrical machine receiving supply of an exciting current from a transistor chopper-type exciting circuit in which a first pair of facing arms of a bridge circuit is configured with power transistors, and a second pair of arms is configured with diodes, and the rotating electrical machine having a power generation function based on rotational force of the engine, and during the automatic stop of the engine, the control apparatus executing first grounding control in which, among the first pair of arms, the power transistor connected on an earth side of the rotating electrical machine is put into an ON state, and the power transistor connected on an output terminal side of the rotating electrical machine is put into an OFF state.

The rotating electrical machine has a power running function of applying rotational force to the engine in a state where an exciting current is supplied from the exciting circuit, and the control apparatus includes a first diagnosis unit configured to execute a first diagnosis of making a diagnosis as to whether the exciting current flows while both power transistors in the first pair of arms are put into an ON state before the first grounding control is executed during the automatic stop of the engine.

According to the above-described configuration, at the vehicle, the engine is automatically stopped in the case where the predetermined automatic stop condition is satisfied, and thereafter, the engine is automatically restarted in the case where the predetermined restarting condition is satisfied. The rotating electrical machine having the power generation function receives supply of the exciting current from the transistor chopper-type exciting circuit and executes power generation based on the rotational force of the engine.

Here, during the automatic stop of the engine, the first grounding control is executed in which, among the first pair of arms, the power transistor connected on the earth side of the rotating electrical machine is put into an ON state, and the power transistor connected on the output terminal side of the rotating electrical machine is put into an OFF state. Therefore, even if the rotating electrical machine is stopped during the automatic stop of the engine, the rotor which is stopped is prevented from having floating potential. Accordingly, even if a leakage current is generated, it is possible to pass the leakage current to earth via the power transistor on the earth side, and therefore corrosion of the rotor during the automatic stop of the engine is prevented or suppressed.

Note that the automatic stop of the engine includes idling stop in which idling of the engine is stopped, stop of the engine upon deceleration in which the engine is stopped upon deceleration of the vehicle, stop of the engine upon coasting in which the engine is stopped upon coasting of the vehicle, or the like. Further, a period during the automatic stop of the engine includes a period from when combustion of a fuel at the engine is stopped until and after when rotation of the engine is stopped in the above-described automatic stop.

According to the above-described configuration, the rotating electrical machine has the power running function of providing rotational force to the engine in a state where the exciting current is supplied from the exciting circuit. Therefore, the rotational force is applied to the engine by the rotating electrical machine when the engine restarts. However, in the case where the power transistor of the exciting circuit fails, the exciting current is not applied to the rotating electrical machine when the engine restarts and therefore rotational force cannot be applied to the engine by the rotating electrical machine.

In this regard, according to the above-described configuration, before the first grounding control is executed during the automatic stop of the engine, the first diagnosis is executed to make a diagnosis as to whether the exciting current is flowing while both power transistors in the first pair of arms are put into an ON state. Accordingly, the first grounding control is executed after making a diagnosis as to whether the rotational force can be applied to the engine by the rotating electrical machine.

In second means, as the diodes constituting the second pair of arms, body diodes of the power transistors are respectively used, and during the automatic stop of the engine, the control apparatus executes second grounding control in which, among the second pair of arms, the power transistor connected on an earth side of the rotating electrical machine is put into an ON state, and the power transistor connected on an output terminal side of the rotating electrical machine is put into an OFF state.

According to the above-described configuration, as the diodes constituting the second pair of arms, the body diodes of the power transistors are respectively used. Further, during the automatic stop of the engine, the second grounding control is executed in a similar manner to the first grounding control by the power transistor in the second pair of arms being controlled. Therefore, even if the rotating electrical machine is stopped during the automatic stop of the engine, the rotor which is stopped is prevented from having a floating potential.

In third means, the rotating electrical machine has a power running function of applying rotational force to the engine in a state where an exciting current is supplied from the exciting circuit, and the control apparatus includes a second diagnosis unit configured to execute a second diagnosis of making a diagnosis as to whether the exciting current flows while both power transistors in the second pair of arms are put into an ON state before the second grounding control is executed during the automatic stop of the engine.

According to the above-described configuration, the second diagnosis is executed in a similar manner to the first diagnosis by the power transistors in the second pair of arms being controlled. It is therefore possible to execute the second grounding control after making a diagnosis as to whether the rotational force can be applied to the engine by the rotating electrical machine.

Fourth means for solving the above-described problem is a control apparatus which controls rotating electrical machine which is applied to a vehicle in which an engine is automatically stopped in the case where a predetermined automatic stop condition is satisfied, and, thereafter, the engine is automatically restarted in the case where a predetermined restarting condition is satisfied, the rotating electrical machine receiving supply of an exciting current from a transistor chopper-type exciting circuit in which a first pair of facing arms of a bridge circuit is configured with power transistors, and a second pair of arms is configured with diodes, and the rotating electrical machine having a power generation function based on rotational force of the engine, and during the automatic stop of the engine, the control apparatus executing first grounding control in which, among the first pair of arms, the power transistor connected on an earth side of the rotating electrical machine is put into an ON state, and the power transistor connected on an output terminal side of the rotating electrical machine is put into an OFF state.

As the diodes constituting the second pair of arms, body diodes of the power transistors are respectively used, and during the automatic stop of the engine, the control apparatus executes second grounding control in which, among the second pair of arms, the power transistor connected on an earth side of the rotating electrical machine is put into an ON state, and the power transistor connected on an output terminal side of the rotating electrical machine is put into an OFF state.

The rotating electrical machine has a power running function of applying rotational force to the engine in a state where an exciting current is supplied from the exciting circuit, and the control apparatus includes a second diagnosis unit configured to execute a second diagnosis of making a diagnosis as to whether the exciting current flows while both power transistors in the second pair of arms are put into an ON state before the second grounding control is executed during the automatic stop of the engine.

In fifth means, as the diodes constituting the second pair of arms, body diodes of the power transistors are respectively used, and the control apparatus includes a second diagnosis unit configured to execute a second diagnosis of making a diagnosis as to whether the exciting current flows while both power transistors in the second pair of arms are put into an ON state before the first diagnosis is executed during the automatic stop of the engine, and an off control unit configured to execute off control of putting both power transistors in the second pair of arms into an OFF state after both power transistors in the second pair of arms are put into an ON state by the second diagnosis unit.

According to the above-described configuration, the second diagnosis is executed before the first diagnosis is executed during the automatic stop of the engine. It is therefore possible to make a diagnosis as to whether the rotational force can be applied to the engine by the rotating electrical machine by applying the exciting current from the second pair of arms.

Then, after both power transistors in the second pair of arms are put into an ON state, off control of putting both power transistors in the second pair of arms into an OFF state is executed. Therefore, process proceeds to the first diagnosis, while the second pair of arms are prevented from being short-circuited with the first pair of arms. Then, the first diagnosis is executed so that it is possible to make a diagnosis as to whether the rotational force can be applied to the engine by the rotating electrical machine upon restart of the engine by applying the exciting current from the first pair of arms.

In sixth means, in the off control, the off control unit puts the power transistor connected on the earth side of the rotating electrical machine into an OFF state after putting the power transistor connected on the output terminal side of the rotating electrical machine into an OFF state among the second pair of arms when both power transistors in the second pair of arms are put into an OFF state.

According to the above-described configuration, in the off control, when both power transistors in the second pair of arms are put into an OFF state, among the second pair of arms, after the power transistor connected on the output terminal side of the rotating electrical machine is put into an OFF state, the power transistor connected on the earth side of the rotating electrical machine is put into an OFF state. Therefore, when the power transistor connected on the output terminal side of the rotating electrical machine is put into an OFF state, it is possible to form the same state as a state where the second grounding control is executed. Accordingly, the rotor which is stopped is prevented from having a floating potential, and then process proceeds to the first diagnosis.

In seventh means, the vehicle includes a starter configured to apply rotational force to the engine upon start of the engine, and, in the case where it is diagnosed by the first diagnosis unit that the exciting current does not flow, rotational force is applied to the engine by the starter upon the automatic restart.

According to the above-described configuration, because the vehicle includes a starter which applies the rotational force to the engine upon start of the engine, the rotational force can be applied to the engine by the starter upon restart of the engine. In the case where it is diagnosed in the first diagnosis that the exciting current does not flow, the rotational force is applied to the engine by the starter upon the automatic restart. Therefore, when it is diagnosed that there is a failure in the exciting circuit, the engine can be restarted by the starter.

In eighth means, the vehicle includes a starter configured to apply rotational force to the engine upon start of the engine, and, in the case where it is diagnosed by the first diagnosis unit or the second diagnosis unit that the exciting current does not flow, rotational force is applied to the engine by the starter upon the automatic restart.

According to the above-described configuration, it is possible to make a diagnosis of a failure in the exciting circuit in the first diagnosis and the second diagnosis, and, in the case where it is diagnosed in the first diagnosis or the second diagnosis that the exciting current does not flow, the engine can be restarted by the starter.

In ninth means, the control apparatus executes the first grounding control further on condition that rotation speed of the engine is lower than predetermined rotation speed.

In the case where the first grounding control is executed, among the first pair of arms, because the power transistor connected on the earth side of the rotating electrical machine is put into an ON state, a closed circuit which applies an exciting current in the exciting circuit is formed. Therefore, in the case where the rotation speed of the engine is high, there is a possibility that power generation is executed at the rotating electrical machine, and therefore excessive braking torque may act on the engine.

In this regard, according to the above-described configuration, the first grounding control is executed further on condition that the rotation speed of the engine is lower than the predetermined rotation speed. Therefore, during the automatic stop of the engine, the first grounding control is executed in the case where the rotation speed of the engine is lower than the predetermined rotation speed, and the first grounding control is not executed in the case where the rotation speed of the engine is higher than the predetermined rotation speed. Therefore, when the first grounding control is executed, excessive braking torque can be prevented from acting on the engine.

In tenth means, the control apparatus executes the second grounding control further on condition that rotation speed of the engine is lower than predetermined rotation speed.

According to the above-described configuration, when the second grounding control is executed, excessive braking torque can be prevented from acting on the engine.

A leakage current flowing through the rotor becomes greater and the rotor corrodes more easily in the case where a voltage supplied to the exciting circuit is 48 V than in the case where the voltage supplied to the exciting circuit is 12 V.

In this regard, in eleventh means, a voltage of 48 V is supplied to the exciting circuit on the assumption that any of the first to tenth means is used. It is therefore possible to prevent or suppress corrosion of the rotor in a configuration where the rotor corrodes easily.

Specifically, as in twelfth means, it is possible to employ a configuration where the exciting current is supplied to a rotor winding of the rotating electrical machine from the exciting circuit.

BRIEF DESCRIPTION OF DRAWINGS

The above and other objects, features and advantages of the present disclosure will be further clarified in the following detailed description with reference to the accompanying drawings, in which.

DESCRIPTION OF EMBODIMENT

An embodiment related to a vehicle which travels using an engine (internal combustion) as a drive source and by driving force being assisted (supported) by rotating electrical machine will be described below based on the drawings.

Figure 1:
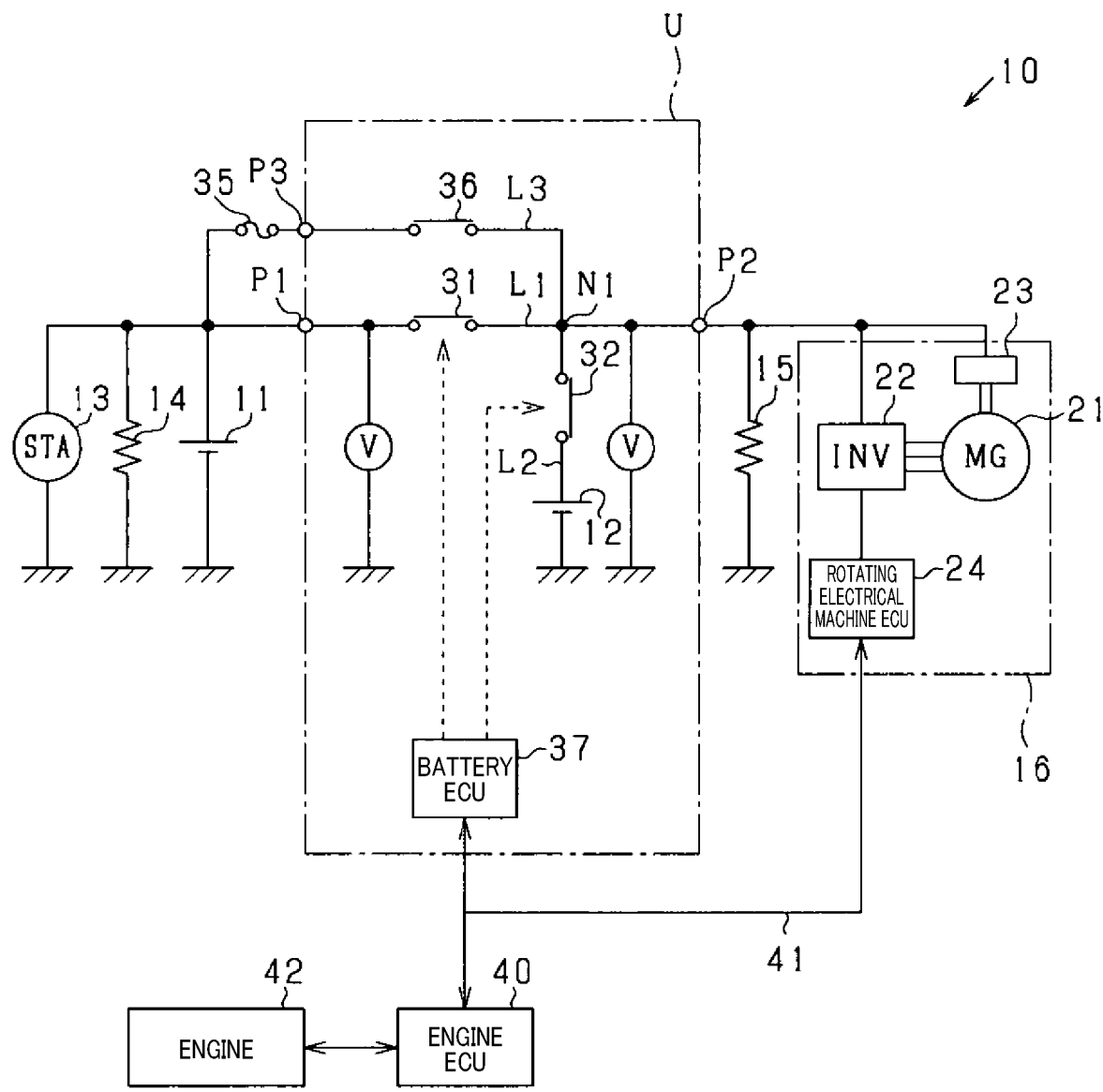
FIG. 1 is an electrical circuit diagram illustrating an electrical configuration of a vehicle.

As illustrated in FIG. 1, a vehicle 10 includes an engine 42, a starter 13, a lead battery 11, a lithium ion battery 12, electric loads 14 and 15, a rotating electrical machine unit 16, or the like.

The engine 42, which is a gasoline engine, a diesel engine, or the like, generates driving force by combustion of fuels. The starter 13 (starting apparatus) applies initial rotational force to an output shaft (crank shaft) of the engine 42 upon start of the engine 42.

A power supply system of the vehicle 10 is a double power supply system which includes the lead battery 11 and the lithium ion battery 12 as electric storage units. From respective batteries 11 and 12, power can be fed to the starter 13, various kinds of electric loads 14 and 15, and the rotating electrical machine unit 16. Further, the respective batteries 11 and 12 can be charged by the rotating electrical machine unit 16. In the present system, the lead battery 11 and the lithium ion battery 12 are connected in parallel to each of the rotating electrical machine unit 16 and the electric loads 14 and 15.

The lead battery 11 is a well-known general-purpose battery. The lithium ion battery 12 is a high-density battery which has a smaller power loss in charging and discharging and higher output density and higher energy density than the lead battery 11. The lithium ion battery 12 is preferably a battery having higher energy efficiency upon charging and discharging than the lead battery 11. This lithium ion battery 12 is configured as an assembled battery including a plurality of single cells. Rated voltages of these batteries 11 and 12 are all the same, and, for example, 12 V.

The lithium ion battery 12 is stored in a storage case and is configured as a battery unit U integrated with a substrate. The battery unit U has two output terminals P1 and P2, the lead battery 11, the starter 13 and the electric load 14 are connected to the output terminal P1, and the electric load 15 and the rotating electrical machine unit 16 are connected to the output terminal P2.

Demands for voltages of power supplied from the respective batteries 11 and 12 are different between the electric loads 14 and 15. Specifically, the electric load 14 includes a constant voltage demanding load for which it is required that a voltage of supplied power should be constant or should be stable, that is, at least fluctuate within a predetermined range. In contrast to this, the electric load 15 is a typical electric load other than the constant voltage demanding load.

Specific examples of the electric load 14 which is the constant voltage demanding load can include a navigation apparatus, an audio apparatus, a meter apparatus and various kinds of ECUs such as an engine ECU. In this case, by fluctuation of a voltage of supplied power being suppressed, occurrence of unnecessary reset, or the like, is suppressed at the above-described respective apparatuses to realize stable operation. The electric load 14 may include an actuator of a traveling system such as an electric power steering apparatus and a brake apparatus. Specific examples of the electric load 15 can include a seat heater, a heater for a defroster of a rear window, a headlight, a wiper of a front window, a blast fan of an air conditioning apparatus, or the like.

The rotating electrical machine unit 16 includes rotating electrical machine 21, an inverter 22, a field circuit 23, and a rotating electrical machine ECU 24 which controls actuation of the rotating electrical machine 21. The rotating electrical machine unit 16 is a generator having a motor function and is configured as an electromechanical ISG (Integrated Starter Generator). Details of the rotating electrical machine unit 16 will be described later.

At the battery unit U, an electric path L1 connecting the respective output terminals P1 and P2, and an electric path L2 connecting a point N1 on the electric path L1 and the lithium ion battery 12 are provided as electric paths within the unit. Among these, a switch 31 is provided on the electric path L1, and a switch 32 is provided on the electric path L2.

Further, a bypass path L3 which bypasses the switch 31 is provided at the battery unit U. The bypass path L3 is provided so as to connect the output terminal P3 and the point N1 on the electric path L1. The output terminal P3 is connected to the lead battery 11 via a fuse 35. With this bypass path L3, it is possible to connect the lead battery 11 to the electric load 15 and the rotating electrical machine unit 16 without via the switch 31. On the bypass path L3, a bypass switch 36 formed with, for example, a normally closed type mechanical relay is provided. By the bypass switch 36 being turned on (closed), even if the switch 31 is turned off (open), the lead battery 11 is electrically connected to the electric load 15 and the rotating electrical machine unit 16.

The battery unit U includes a battery ECU 37 which controls on and off (open and closed) of the respective switches 31 and 32. The battery ECU 37 is configured with a microcomputer including a CPU, a ROM, a RAM, an input/output interface, or the like. The battery ECU 37 controls on and off switching of the respective switches 31 and 32 based on a traveling state of the vehicle 10 and electricity storage states of the respective batteries 11 and 12. By this means, charging and discharging are performed selectively using the lead battery 11 and the lithium ion battery 12. For example, the battery ECU 37 calculates a charging ratio SOC (State Of Charge) of the lithium ion battery 12 and controls a charging amount and a discharging amount to the lithium ion battery 12 so that the charging ratio SOC is maintained within a predetermined range of use.

The engine ECU 40 as an upper control apparatus which comprehensively manages the respective ECUs 24 and 37 are connected to the rotating electrical machine ECU 24 of the rotating electrical machine unit 16 and the battery ECU 37 of the battery unit U. The engine ECU 40 is configured with a microcomputer including a CPU, a ROM, a RAM, an input/output interface, or the like, and controls operation of the engine 42 based on an engine operation state and a vehicle traveling state of each time. The respective ECUs 24, 37 and 40 can perform communication with each other by being connected using a communication line 41 which constitutes a communication network such as a CAN, and bidirectional communication is performed with a predetermined period. By this means, various kinds of data stored in the respective ECUs 24, 37 40 are shared with each other.

The engine ECU 40 causes the engine 42 to be automatically stopped in the case where predetermined automatic stop conditions are satisfied, and, thereafter, causes the engine 42 to be automatically restarted in the case where predetermined restarting conditions are satisfied. To cause the engine 42 to be automatically stopped, combustion of a fuel at the engine 42 is stopped. Specifically, injection and ignition of a fuel are stopped in a case of a gasoline engine, and injection of a fuel is stopped in a case of a diesel engine. Then, in the automatic stop, a period during the automatic stop of the engine 42 includes a period from when combustion of a fuel at the engine 42 is stopped until and after when rotation of the engine 42 is stopped (a state where rotation of the engine 42 is stopped).

The automatic stop conditions include at least one of that an operation amount of an accelerator operating member of the vehicle 10 is 0 (smaller than a predetermined operation amount), that an operation amount of a brake operating member is not 0 (or greater than a predetermined operation amount), and that speed of the vehicle 10 is lower than predetermined speed. That is, the automatic stop of the engine 42 includes idling stop in which idling of the engine 42 is stopped, stop of the engine upon deceleration in which the engine 42 is stopped upon deceleration of the vehicle 10, and stop of the engine upon coasting in which the engine 42 is stopped upon coasting of the vehicle 10. The automatic restarting conditions include at least one of that the operation amount of the accelerator operating member of the vehicle 10 is not 0 (or greater than a predetermined operation amount), that the operation amount of the brake operating member is 0 (or smaller than a predetermined operation amount), and that the speed of the vehicle 10 is higher than predetermined speed.

Figure 2:
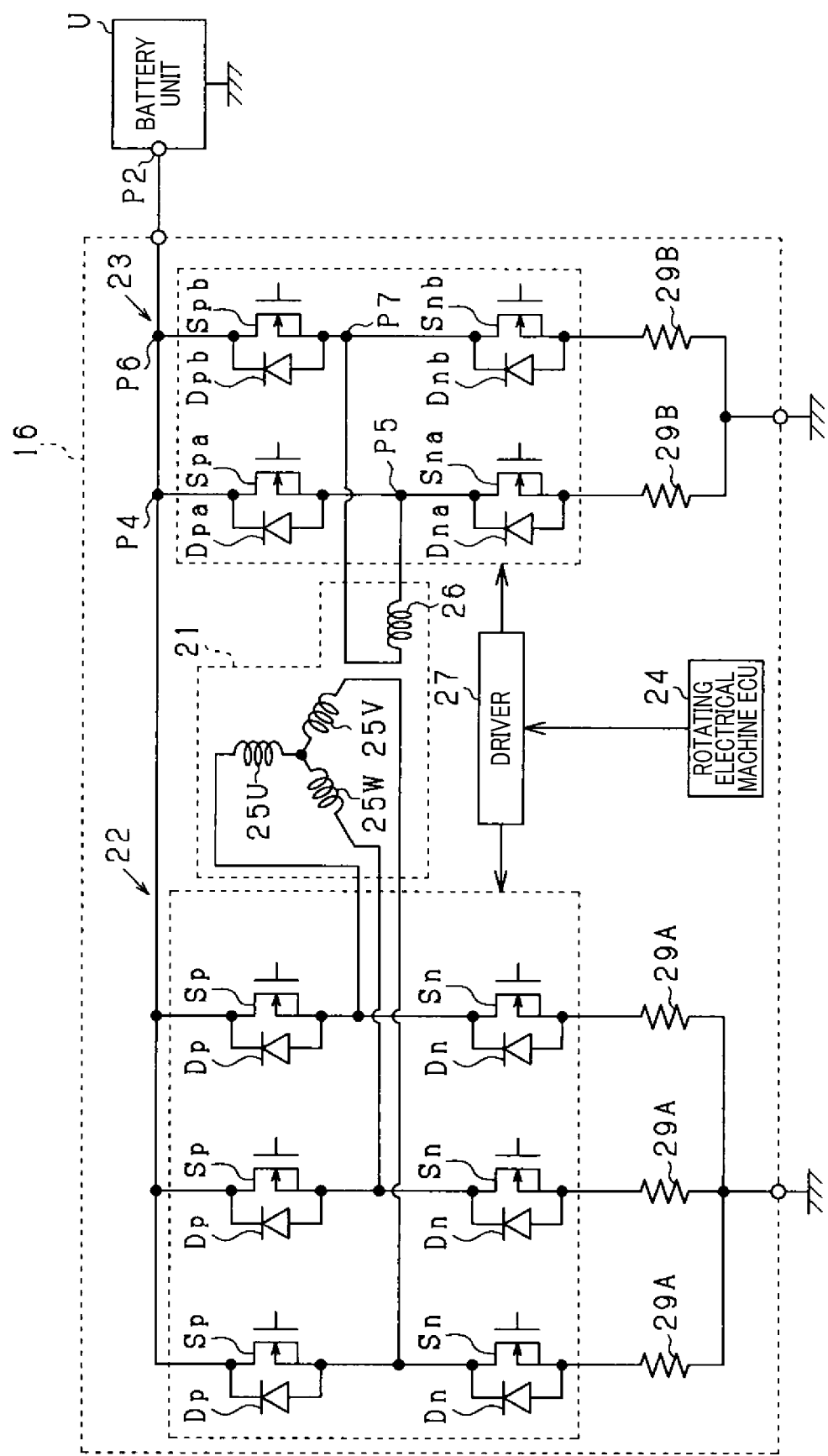
FIG. 2 is an electrical circuit diagram illustrating an electrical configuration of a rotating electrical machine unit.

An electrical configuration of the rotating electrical machine unit 16 will be described next using FIG. 2. The rotating electrical machine 21 is a three-phase AC motor, and includes phase windings 25U, 25V and 25W of a U phase, a V phase and a W phase as a three-phase armature winding and a field winding 26 as a rotor winding. The rotating electrical machine unit 16 has a power generation function of generating power (regeneration) by rotation of an engine output shaft and an axle shaft, and a power running function of applying rotational force to the engine output shaft. Specifically, the rotating shaft of the rotating electrical machine 21 is coupled to the engine output shaft which is not illustrated via a belt so as to be able to transmit driving force. Through this belt, power is generated by the rotating shaft of the rotating electrical machine 21 rotating in association with rotation of the engine output shaft, and force is provided by the engine output shaft rotating in association with rotation of the rotating shaft of the rotating electrical machine 21.

The inverter 22 converts AC voltages output from the respective phase windings 25U, 25V and 25W into DC voltages and outputs the DC voltages to the battery unit U. Further, the inverter 22 converts a DV voltage input from the battery unit U into an AC voltage and outputs the AC voltage to the respective phase windings 25U, 25V and 25W. The inverter 22 is a bridge circuit having upper and lower arms of the same number as the number of phases of the phase winding and constitutes a three-phase full-wave rectifier circuit. The inverter 22 constitutes a drive circuit which drives the rotating electrical machine 21 by adjusting power supplied to the armature winding of the rotating electrical machine 21 in a state where a field current (exciting current) is supplied from the field circuit 23 to the field winding 26.

The inverter 22 includes an upper arm switch Sp and a lower arm switch Sn for each phase. In the present embodiment, as the respective switches Sp and Sn (power transistors), voltage-controlled semiconductor switching elements are used, and, specifically, N-channel MOSFETs are used. An upper arm diode Dp is connected to the upper arm switch Sp in inverse parallel, and a lower arm diode Dn is connected to the lower arm switch Sn in inverse parallel. In the present embodiment, as the respective diodes Dp and Dn, body diodes of the respective switches Sp and Sn are used. Note that, the respective diodes Dp and Dn are not limited to body diodes, and, for example, diodes of parts different from the respective switches Sp and Sn may be used. Intermediate connection points of serial connection bodies of the switches Sp and Sn in respective phases are respectively connected to one ends of the respective phase windings 25U, 25V and 25W.

The field circuit 23 is a bidirectional switch and can apply a DC voltage to the field winding 26. In the present embodiment, the field circuit 23 (a transistor chopper-type exciting circuit) constitutes an H-bridge rectifier circuit in which four switches Spa, Sna, Spb and Snb are combined. Because basic configurations of the respective switches Spa, Sna, Spb and Snb (power transistors) are the same as those of the respective switches of the inverter 22, description will be omitted here. In the present embodiment, by a DC voltage to be applied to the field winding 26 being adjusted by switching control of the respective switches Spa, Sna, Spb and Snb, a direction and a current amount of the field current flowing through the field winding 26 are controlled. Note that power transistors in a first pair of facing arms are configured with switches Spa and Snb, and diodes in a second pair of arms are configured with diodes Dna and Dpb.

On and off switching of the respective switches Sp, Sn, Spa, Sna, Spb and Snb constituting the inverter 22 and the field circuit 23 are switched respectively and individually via a driver 27. In the present system, a current detecting unit 29A which detects respective phase currents iu, iv and iw, and a current detecting unit 29B which detects a field current if are respectively provided. As the current detecting units 29A and 29B, for example, ones including a current transformer and a resistor are used.

The rotating electrical machine ECU 24 (control apparatus of the rotating electrical machine) is configured with a microcomputer including a CPU, a ROM, a RAM, an input/output interface, or the like. The rotating electrical machine ECU 24 controls a power generation voltage of the rotating electrical machine unit 16 (output voltage to the battery unit U) by adjusting the field current to be applied to the field winding 26. Further, the rotating electrical machine ECU 24 assists the driving force of the engine 42 by controlling the inverter 22 to drive the rotating electrical machine 21 after traveling of the vehicle 10 is started. The rotating electrical machine 21 can provide initial rotation to the output shaft upon start of the engine, and also has a function as an engine starting apparatus.

Incidentally, there is a possibility that the rotor corrodes as a result of the rotating electrical machine 21 being stopped during the automatic stop of the engine 42, and a leakage current flowing through the rotor which is in a stop state. For details, when the engine 42 of the vehicle 10 is in a stop state, because the respective switches Spa, Sna, Spb and Snb are turned off, the field winding 26 of the rotor at this time is potentially floated. There is a case where, in cold regions, or the like, water including a snow melting agent is poured over the rotating electrical machine 21. In such a case, there is a case where a leakage current is generated between an exposed connection terminal P4 (P6) of the switch Spa (Spb) of the upper arm and an exposed connection terminal P5 (P7). As a result, there is a possibility that a rotor potential becomes equal to a potential of the output terminal P2 of the battery unit U, a current flows between the rotor and an armature iron core (stator iron core) which is an earth potential, and rust (corrosion) occurs in an extremely narrow air gap.

To address this, in the present embodiment, the rotating electrical machine ECU 24 (a first diagnosis unit, a second diagnosis unit and an off control unit) executes the following first diagnosis, first grounding control, second diagnosis and off control (second grounding control) during the automatic stop of the engine 42. Specifically, the rotating electrical machine ECU 24 executes the second diagnosis, the off control (second grounding control), the first diagnosis and the first grounding control in this order.

Figure 3:
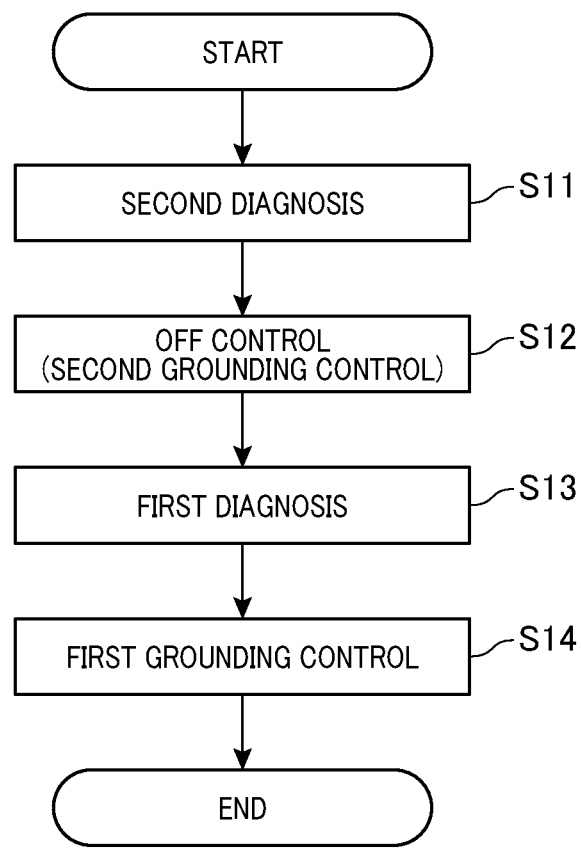
FIG. 3 is a flowchart illustrating a procedure of a diagnosis and grounding control.

FIG. 3 is a flowchart illustrating procedure of the above-described diagnosis and grounding control. This series of processing is executed by the rotating electrical machine ECU 24 when a state of the engine 42 transitions from an operation state to an automatic stop state. It is judged that the engine 42 is in an automatic stop state on the basis that injection and ignition of a fuel of the engine 42 are stopped, that the automatic stop conditions are satisfied, or the like. Further, this series of processing is executed on condition that the rotation speed of the engine 42 is lower than predetermined rotation speed (for example, 200 rpm). That is, even during the automatic stop of the engine 42, in the case where the rotation speed of the engine 42 is higher than the predetermined rotation speed, this series of processing is not executed. Note that the rotation speed of the engine 42 can be calculated based on a detection value of a crank angle sensor, or the like.

First, as the second diagnosis, it is diagnosed as to whether a field current flows through the field winding 26 while both switches Spb and Sna are put into an ON state in the above-described second pair of arms (S11). Specifically, it is judged whether a field current flows through the field winding 26 based on a detection value of the current detecting unit 29B which detects the field current if.

Subsequently, after both switches Spb and Sna are put into an ON state in the second pair of arms in the above-described second diagnosis, as the off control, both switches Spb and Sna are put into an OFF state in the second pair of arms (S12). For details, among the second pair of arms, after the switch Spb connected on the output terminal side of the rotating electrical machine 21 is put into an OFF state, the switch Sna connected on the earth side of the rotating electrical machine 21 is put into an OFF state. That is, when the switch Spb connected on the output terminal side of the rotating electrical machine 21 is put into an OFF state, the switch Sna connected on the earth side of the rotating electrical machine 21 is put into an ON state. Control of forming this state corresponds to the second grounding control.

Subsequently, as the first diagnosis, it is diagnosed as to whether a field current flows through the field winding 26 while both switches Spa and Snb are put into an ON state in the above-described first pair of arms (S13). Specifically, it is judged whether a field current flows through the field winding 26 based on a detection value of the current detecting unit 29B which detects the field current if.

Subsequently, as the first grounding control, among the first pair of arms, the switch Spa connected on the output terminal side of the rotating electrical machine 21 is put into an OFF state (S14). At this time, among the first pair of arms, the switch Snb connected on the earth side of the rotating electrical machine 21 is put into an ON state. Then, this series of processing is finished (END).

Note that the processing in S11 corresponds to processing as a second diagnosis unit, the processing in S12 corresponds to processing as an off control unit, and the processing in S13 corresponds to processing as a first diagnosis unit.

Then, in the case where it is diagnosed in the above-described first diagnosis or the above-described second diagnosis that a field current does not flow through the field winding 26, the engine ECU 40 applies rotational force to the engine 42 by the starter 13 upon automatic restart.

The present embodiment described in detail above has the following advantages.

During automatic stop of the engine 42, among the first pair of arms, the first grounding control is executed in which the switch Snb connected on the earth side of the rotating electrical machine 21 is put into an ON state, and the switch Spa connected on the output terminal side of the rotating electrical machine 21 is put into an OFF state. Therefore, even if the rotating electrical machine 21 is stopped during the automatic stop of the engine 42, the rotor which is stopped is prevented from having a floating potential. Therefore, even if a leakage current is generated, it is possible to pass the leakage current through the earth via the switch Snb on the earth side, and therefore corrosion of the rotor during the automatic stop of the engine 42 is prevented or suppressed.

In the case where the switches Spa, Sna, Spb and Snb of the field circuit 23 fail, a field current cannot be applied to the rotating electrical machine 21 upon restart of the engine 42, and therefore rotational force cannot be applied to the engine 42 by the rotating electrical machine 21. In this regard, before the first grounding control is executed during the automatic stop of the engine 42, the first diagnosis of making a diagnosis as to whether a field current flows is executed while both switches Spa and Snb are put into an ON state in the first pair of arms. It is therefore possible to execute the first grounding control after making a diagnosis as to whether rotational force can be applied to the engine 42 by the rotating electrical machine 21.

Before the first diagnosis is executed during the automatic stop of the engine 42, the second diagnosis is executed. It is therefore possible to make a diagnosis as to whether rotational force can be applied to the engine 42 by the rotating electrical machine 21 by applying a field current from the second pair of arms. Then, after both switches Spb and Sna are put into an ON state in the second pair of arms, off control is executed in which both switches Spb and Sna are put into an OFF state in the second pair of arms. Therefore, process proceeds to the first diagnosis, while the second pair of arms are prevented from being short-circuited with the first pair of arms.

In the off control, when both switches Spb and Sna are put into an OFF state in the second pair of arms, among the second pair of arms, after the switch Spb connected on the output terminal side of the rotating electrical machine 21 is put into an OFF state, the switch Sna connected on the earth side of the rotating electrical machine 21 is put into an OFF state. Therefore, when the switch Spb connected on the output terminal side of the rotating electrical machine 21 is put into an OFF state, it is possible to form a state where the switch Spb is in an OFF state and the switch Sna is in an ON state (a state where the second grounding control is executed). Accordingly, the rotor which is stopped is prevented from having a floating potential, and then process proceeds to the first diagnosis.

In the case where it is diagnosed in the first diagnosis and the second diagnosis that the field circuit 23 fails, and it is diagnosed in the first diagnosis or the second diagnosis that a field current does not flow, the engine 42 can be restarted by the starter 13.

In the case where the first grounding control or the second grounding control is executed, because, among the first pair of arms, the switch Snb or the switch Sna connected on the earth side of the rotating electrical machine 21 is put into an ON state, a closed circuit which applies a field current to the field circuit 23 is formed. Therefore, in the case where rotation speed of the engine 42 is high, there is a possibility that power generation is executed at the rotating electrical machine 21, and therefore excessive braking torque may act on the engine 42. In this regard, the first grounding control and the second grounding control are executed further on condition that the rotation speed of the engine 42 is lower than predetermined rotation speed. Therefore, when the first grounding control is executed, excessive braking torque can be prevented from acting on the engine 42.

Note that the above-described embodiment can be changed and implemented as follows.

It is also possible to exclude a condition that the rotation speed of the engine 42 is lower than the predetermined rotation speed from conditions for executing the first grounding control and the second grounding control. In this case, it is preferable that connection between the output shaft of the engine 42 and the axle shaft of the vehicle 10 is cut off when the first grounding control and the second grounding control are executed. Further, because the engine 42 is quickly stopped, the time taken for restarting the engine 42 can be reduced.

In the case where it is diagnosed in the first diagnosis or the second diagnosis that a field current does not flow, it is also possible to interrupt the automatic stop of the engine 42. According to such a configuration, in the case where there is a possibility that the engine 42 cannot be automatically restarted by the rotating electrical machine unit 16, it is possible not to cause the engine 42 to be automatically stopped.

In the off control, when both switches Spb and Sna are put into an OFF state in the second pair of arms, it is also possible to put both switches Spb and Sna into an OFF state at the same time in the second pair of arms.

In FIG. 3, the second diagnosis in S11 and the first diagnosis in S13 may be omitted. Further, the rotating electrical machine ECU 24 (control apparatus) can execute only the second grounding control in which, during the automatic stop of the engine 42, among the second pair of arms, the switch Sna (power transistor) connected on the earth side of the rotating electrical machine 21 is put into an ON state, and the switch Spb (power transistor) connected on the output terminal side of the rotating electrical machine 21 is put into an OFF state.

A vehicle 10 which does not include a starter 13 may be employed.

Figure 4:
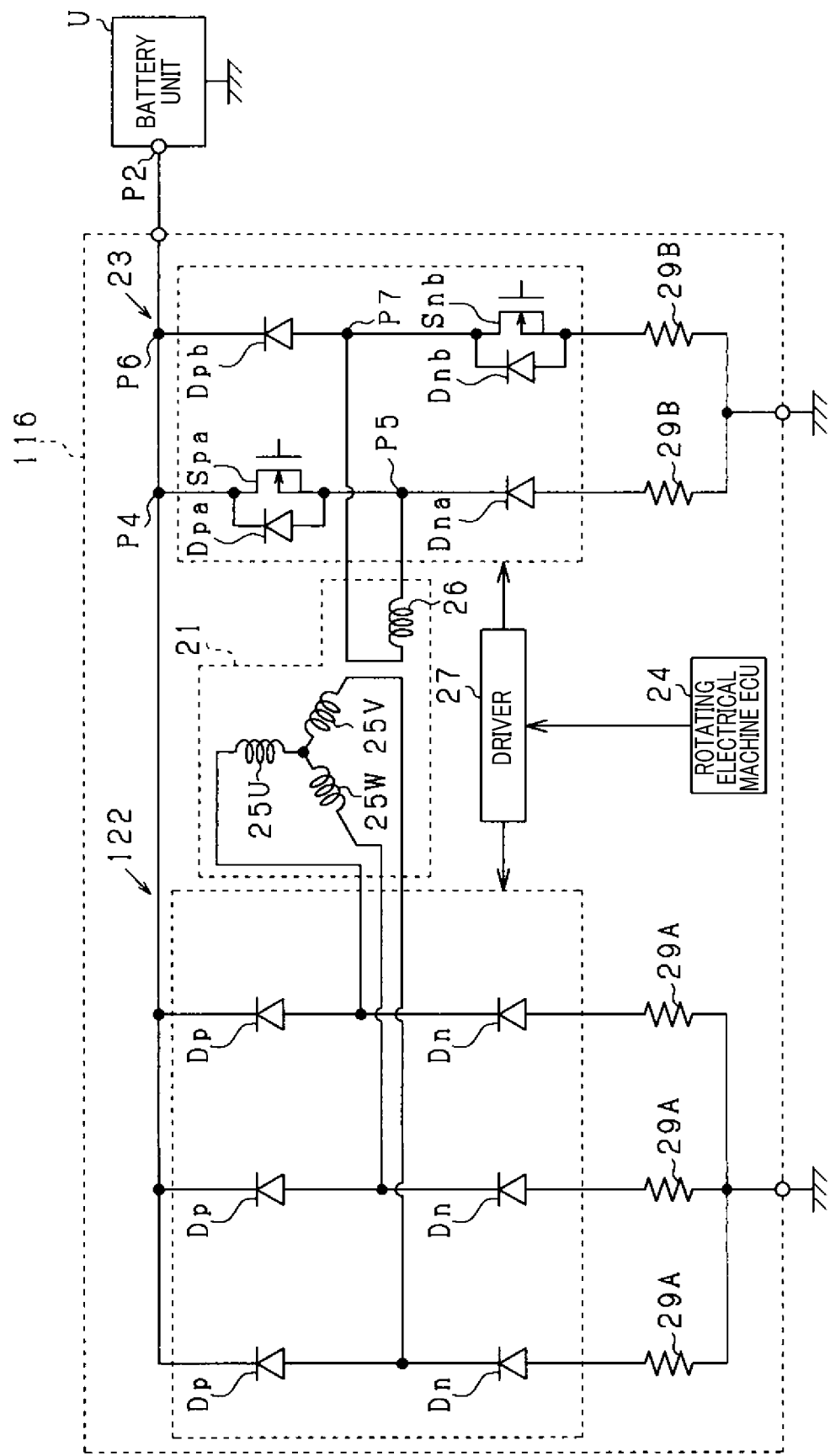
FIG. 4 is an electrical circuit diagram illustrating a modified example of the electrical configuration of the rotating electrical machine unit.

In place of the rotating electrical machine unit 16 having a power running function, a generator unit 116 as illustrated in FIG. 4 may be employed. In this case, it is possible to employ a diode rectifier circuit 122 in FIG. 4 in place of the inverter 22 in FIG. 1, and omit both switches Spb and Sna in the second pair of arms at the field circuit 23. Even with such a configuration, the rotating electrical machine ECU 24 can execute the above-described first diagnosis and first grounding control.

Figure 5:
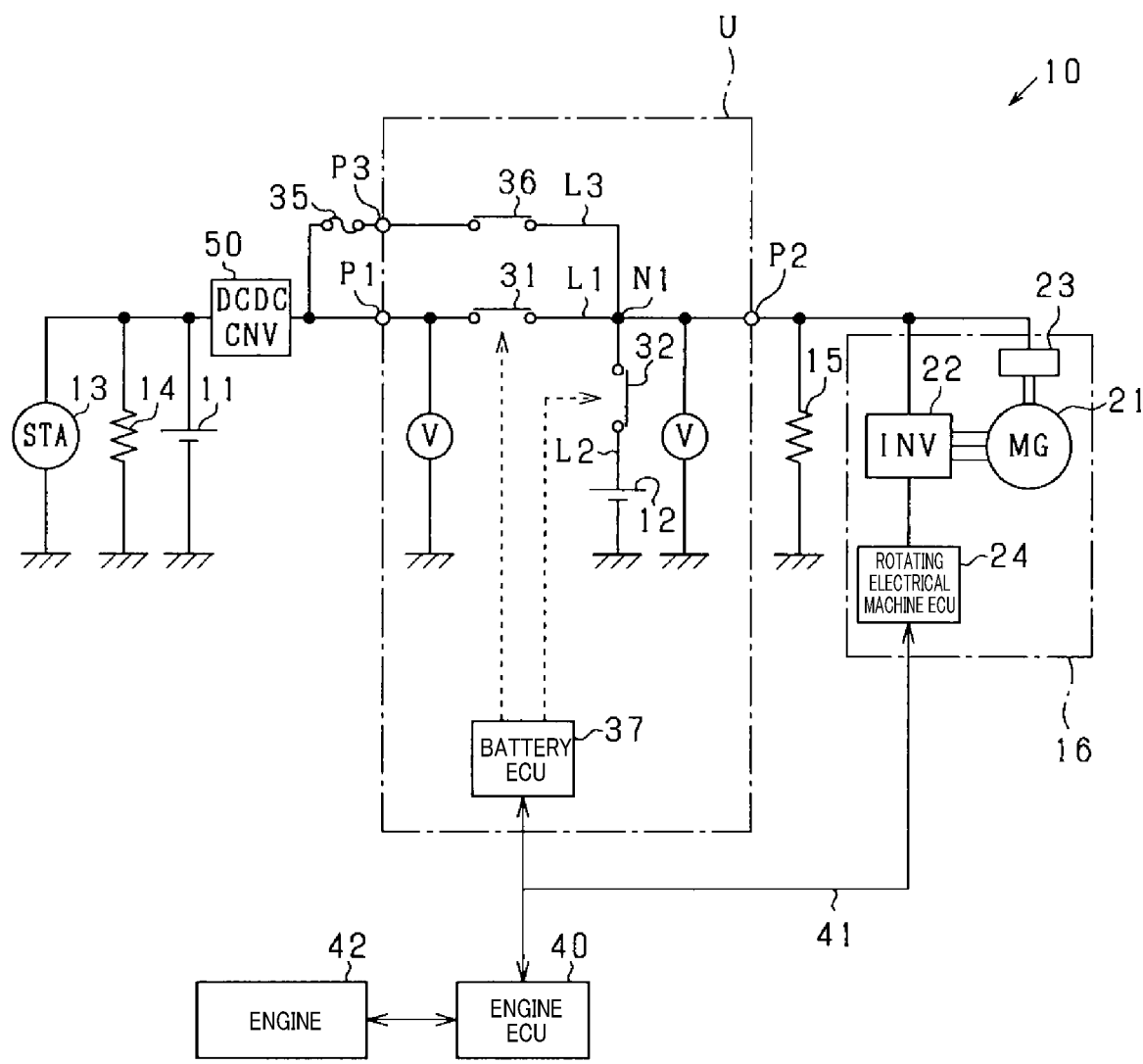
FIG. 5 is an electrical circuit diagram illustrating a modified example of the electrical configuration of the vehicle.

As illustrated in FIG. 5, a rated voltage of the lithium ion battery 12 may be 48 V, the rotating electrical machine 21 may be driven with a voltage of 48 V, and the vehicle 10 may include a bidirectional DC-DC converter 50. According to such a configuration, a voltage of 48 V is supplied to the field circuit 23 (rotating electrical machine unit 16) from the lithium ion battery 12. Further, a voltage supplied from the battery unit U to the lead battery 11 is made to drop by the DC-DC converter 50, and a voltage supplied from the lead battery 11 to the battery unit U is boosted by the DC-DC converter 50.

Here, the leakage current flowing through the rotor becomes greater and the rotor corrodes more easily in the case where the voltage supplied to the field circuit 23 is 48 V than in the case where the voltage supplied to the field circuit 23 is 12 V. Further, there is a case where the rotating electrical machine unit 16 performs control of applying negative torque so that the rotation speed of the engine 42 quickly passes through a resonance range (for example, 200 to 400 rpm) or control of causing a piston of the engine 42 to be stopped at a position appropriate for restart using a voltage of 48 V. In the case where these kinds of control are performed, because a current is applied to the field winding 26 until immediately before the engine 42 is stopped, charge is likely to remain in the field winding 26 when the engine 42 is stopped. Then, if short-circuiting occurs between the connection terminal P5 (P7) and the armature iron core which is at earth potential, due to water including a snow melting agent, or the like, in a state where charge remains in the field winding 26, a leakage current flows between the rotor and the armature iron core, and the rotor easily corrodes. In this regard, by executing each control of the above-described embodiment on the above-described configuration, it is possible to prevent or suppress corrosion of the rotor in a configuration where the rotor easily corrodes.

It is also possible to cause the rotating electrical machine ECU 24 to execute the first diagnosis, the first grounding control, the second diagnosis and the off control (second grounding control) by the engine ECU 40 giving an instruction to the rotating electrical machine ECU 24. That is, the first diagnosis unit, the second diagnosis unit and the off control unit, that is, the control apparatus of the rotating electrical machine can be configured with the engine ECU 40.

While the present disclosure has been described with reference to the examples, the present disclosure is not limited to the examples and structures. The present disclosure incorporates various modified examples and modifications within an equivalent range. In addition, various combinations, forms, and other combinations and forms including only one element or more or less than one elements fall within the scope and the scope of mind of the present disclosure.

What is claimed is:

1. A control apparatus of a rotating electrical machine, which is a control apparatus that controls the rotating electrical machine which is applied to a vehicle in which an engine is automatically stopped in a case where a predetermined automatic stop condition is satisfied, and, thereafter, the engine is automatically restarted in a case where a predetermined restarting condition is satisfied, the rotating electrical machine receiving supply of an exciting current from a transistor chopper-type exciting circuit in which a first pair of facing arms of a bridge circuit is configured with power transistors, and a second pair of arms is configured with diodes, and the rotating electrical machine has a power generation function based on rotational force of the engine, during the automatic stop of the engine, the control apparatus executes a first grounding control in which, among the first pair of arms, the power transistor connected on an earth side of the rotating electrical machine is put into an ON state, and the power transistor connected on an output terminal side of the rotating electrical machine is put into an OFF state, the rotating electrical machine has a power running function of applying rotational force to the engine in a state where an exciting current is supplied from the exciting circuit, and the control apparatus includes a first diagnosis unit configured to execute a first diagnosis of making a diagnosis as to whether the exciting current is flowing while both transistors in the first pair of arms are put into an ON state before the first grounding control is executed during the automatic stop of the engine.

2. The control apparatus of the rotating electrical machine according to claim 1, wherein as the diodes constituting the second pair of arms, body diodes of the power transistors are respectively used, and during the automatic stop of the engine, the control apparatus executes second grounding control in which, among the second pair of arms, the power transistor connected on an earth side of the rotating electrical machine is put into an ON state, and the power transistor connected on an output terminal side of the rotating electrical machine is put into an OFF state.

3. The control apparatus of the rotating electrical machine according to claim 2, wherein the rotating electrical machine has a power running function of applying rotational force to the engine in a state where an exciting current is supplied from the exciting circuit, and the control apparatus includes a second diagnosis unit configured to execute a second diagnosis of making a diagnosis as to whether the exciting current flows while both power transistors in the second pair of arms are put into an ON state before the second grounding control is executed during the automatic stop of the engine.

4. The control apparatus of the rotating electrical machine according to claim 2, wherein the control apparatus executes the second grounding control further on condition that rotation speed of the engine is lower than predetermined rotation speed.

5. The control apparatus of the rotating electrical machine according to claim 1, wherein
as the diodes constituting the second pair of arms, body diodes of the power transistors are respectively used, and
the control apparatus includes:
a second diagnosis unit configured to execute a second diagnosis of making a diagnosis as to whether the exciting current flows while both power transistors in the second pair of arms are put into an ON state before the first diagnosis is executed during the automatic stop of the engine; and
an off control unit configured to execute off control of putting both power transistors in the second pair of arms into an OFF state after both power transistors in the second pair of arms are put into an ON state by the second diagnosis unit.

6. The control apparatus of the rotating electrical machine according to claim 5, wherein
in the off control, when both power transistors in the second pair of arms are put into an OFF state among the second pair of arms, the off control unit puts the power transistor connected on an earth side of the rotating electrical machine into an OFF state after putting the power transistor connected on an output terminal side of the rotating electrical machine into an OFF state.

7. The control apparatus of the rotating electrical machine according to claim 5, wherein
the vehicle includes a starter configured to apply rotational force to the engine upon start of the engine, and
in a case where it is diagnosed by the first diagnosis unit or the second diagnosis unit that the exciting current does not flow, rotational force is applied to the engine by the starter upon the automatic restart.

8. The control apparatus of the rotating electrical machine according to claim 1, wherein
the vehicle includes a starter configured to apply rotational force to the engine upon start of the engine, and
in a case where it is diagnosed by the first diagnosis unit that the exciting current does not flow, rotational force is applied to the engine by the starter upon the automatic restart.

9. The control apparatus of the rotating electrical machine according to claim 1, wherein
the control apparatus executes the first grounding control further on condition that rotation speed of the engine is lower than predetermined rotation speed.

10. The control apparatus of the rotating electrical machine according to claim 1, wherein
a voltage of 48 V is supplied to the exciting circuit.

11. The control apparatus of the rotating electrical machine according to claim 1, wherein
the exciting current is supplied to a rotor winding of the rotating electrical machine from the exciting circuit.

12. A control apparatus of a rotating electrical machine, which is a control apparatus that controls the rotating electrical machine which is applied to a vehicle in which an engine is automatically stopped in a case where a predetermined automatic stop condition is satisfied, and, thereafter, the engine is automatically restarted in a case where a predetermined restarting condition is satisfied, the rotating electrical machine receiving supply of an exciting current from a transistor chopper-type exciting circuit in which a first pair of facing arms of a bridge circuit is configured with power transistors, and a second pair of arms is configured with diodes, and the rotating electrical machine has a power generation function based on rotational force of the engine,
during the automatic stop of the engine, the control apparatus executes a first grounding control in which, among the first pair of arms, the power transistor connected on an earth side of the rotating electrical machine is put into an ON state, and the power transistor connected on an output terminal side of the rotating electrical machine is put into an OFF state,
as the diodes constituting the second pair of arms, body diodes of the power transistors are respectively used,
during the automatic stop of the engine, the control apparatus executes second grounding control in which, among the second pair of arms, the power transistor connected on an earth side of the rotating electrical machine is put into an ON state, and the power transistor connected on an output terminal side of the rotating electrical machine is put into an OFF state,
the rotating electrical machine has a power running function of applying rotational force to the engine in a state where an exciting current is supplied from the exciting circuit, and
the control apparatus includes a second diagnosis unit configured to execute a second diagnosis of making a diagnosis as to whether the exciting current flows while both power transistors in the second pair of arms are put into an ON state before the second grounding control is executed during the automatic stop of the engine.

* * * * *